United States Patent [19]

Brems et al.

[11] 4,380,959
[45] * Apr. 26, 1983

[54] SPEED CONTROL FOR GRAVITY OPERATED TROLLEYS

[75] Inventors: John H. Brems, Birmingham; James T. Graham, Rochester, both of Mich.

[73] Assignee: F. Jos. Lamb Company, Warren, Mich. ; a part interest

[*] Notice: The portion of the term of this patent subsequent to Feb. 23, 1999, has been disclaimed.

[21] Appl. No.: 174,812

[22] Filed: Aug. 4, 1980

Related U.S. Application Data

[63] Continuation-in-part of Ser. No. 908,941, May 24, 1978, abandoned.

[51] Int. Cl.³ .............................................. B61B 3/00
[52] U.S. Cl. ..................................... 104/93; 188/290; 198/473; 104/89
[58] Field of Search .................. 198/473, 472; 104/89, 104/93; 105/148, 150; 188/267, 290

[56] References Cited

U.S. PATENT DOCUMENTS

| | | | |
|---|---|---|---|
| 2,832,298 | 4/1958 | Ambli | 105/150 |
| 4,098,375 | 7/1978 | Kornylak | 188/290 |
| 4,215,772 | 8/1980 | Graham | 188/290 |
| 4,316,535 | 2/1982 | Brems et al. | 188/290 |

Primary Examiner—Joseph E. Valenza
Attorney, Agent, or Firm—Barnes, Kisselle, Raisch, Choate, Whittemore & Hulbert

[57] ABSTRACT

A gravity operated conveyor comprises a workpiece supporting trolley having at least two independent unpowered wheels for supporting the trolley on a track. One of the wheels engages the track when the trolley is empty and the other engages the track when the trolley is loaded with a workpiece. Each wheel has a speed retarding mechanism operably connected therewith so that the speed retarding force on the trolley is greater when the trolley is loaded than when the trolley is empty.

12 Claims, 5 Drawing Figures

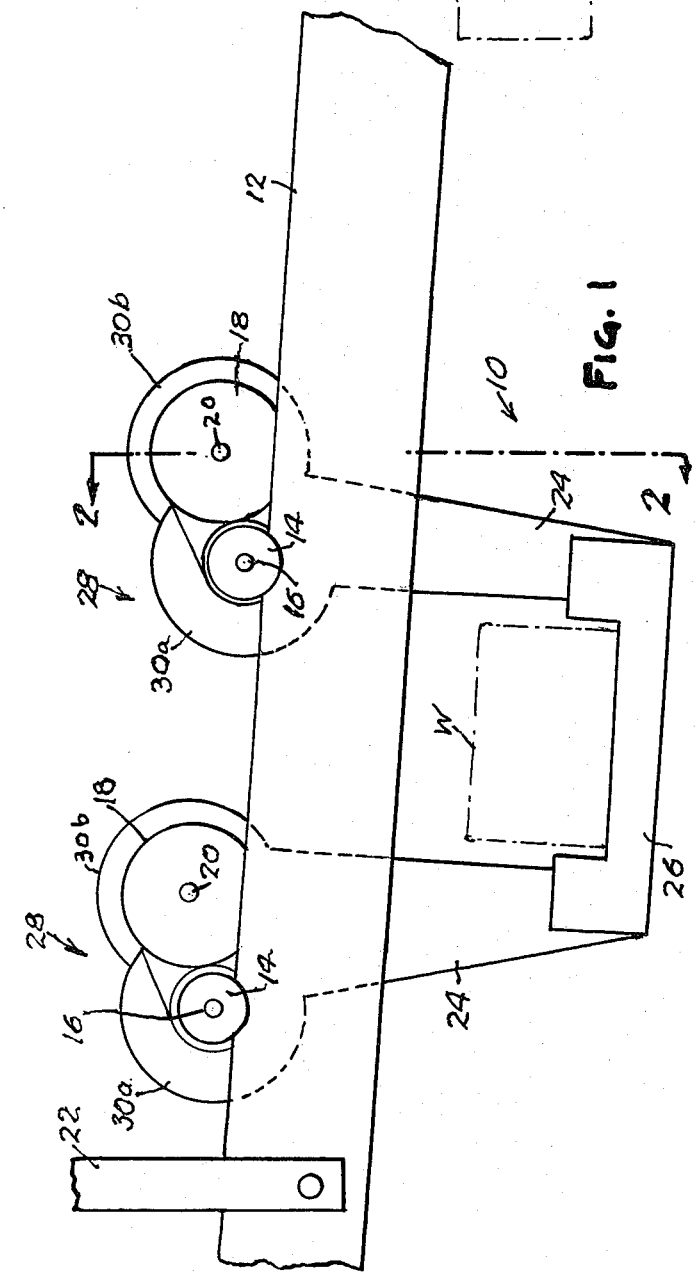
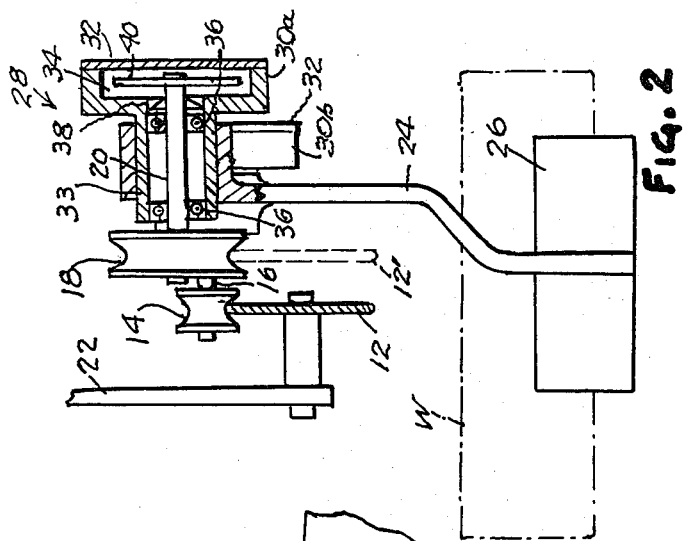
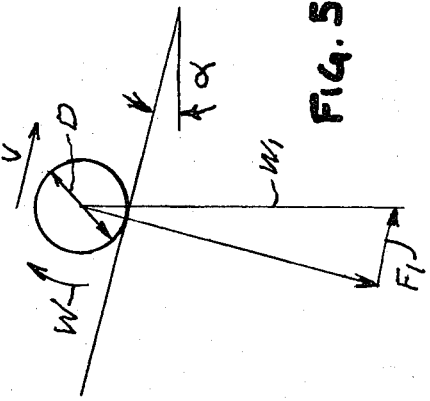
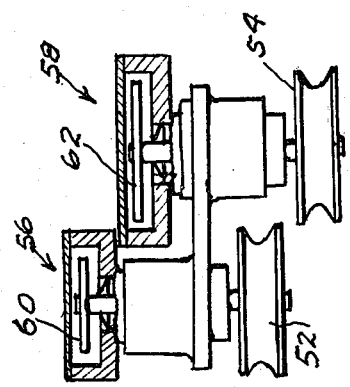
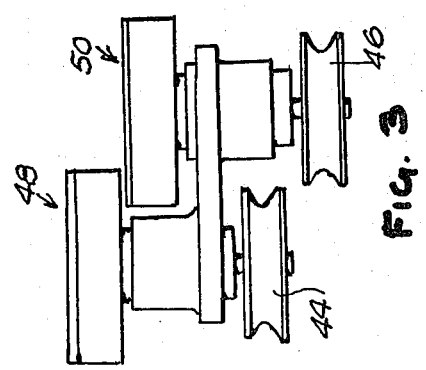

SPEED CONTROL FOR GRAVITY OPERATED TROLLEYS

This application is a continuation-in-part of our co-pending application Ser. No. 908,941, filed on May 24, 1978 and entitled "Workpiece Storage System", abandoned in favor of continuing application Serial No. 06/176,562, filed Aug. 8, 1980, now U.S. Pat. No. 4,316,535, dated Feb. 23, 1982.

This invention relates to gravity conveyors and, more particularly, to conveyors of the type which include a work supporting trolley having wheels which are powered by gravity on a downwardly inclined track. In conveyors of this type the speed of the trolley increases until its terminal velocity is attained or until the trolley is stopped by some mechanical means such as a barrier or by abutting against the last trolley in a queue of trolleys at rest. This results in an impact that can be destructive to the trolley, the workpiece, or both.

Various means have been proposed to control the velocity of such trolleys. One of the most commonly used devices is a retarding brake which is torsionally attached to a trolley wheel. The rotating member of the retarding brake is confined in a cavity that contains a viscous fluid. The retarding brake can be so designed that the resistance caused by the viscous fluid between the stationary wall of the cavity and the adjacent surface of the rotating member results in a desired low velocity. The use of a retarder of this type is only satisfactory in arrangements where the wheels of all of the trolleys are uniformly loaded at all times. However, in most conveyor arrangements of this type the trolley wheels are not uniformly loaded at all times. At one time the trolley is empty and the load on the trolley wheels is the weight of the trolley itself. At other times a trolley carries a workpiece and the load on the trolley wheels is therefore the combined weight of the trolley and the weight of the workpiece. In order to achieve a satisfactory low velocity of the trolley under both conditions of loading it is necessary to employ a mechanism capable of applying two different retarding forces of the trolley.

In our copending application Ser. No. 908,941, filed on May 24, 1978, of which this application is a continuation-in-part, the desired low velocity of the trolley under both conditions of loading is obtained by employing a trolley wheel having two different diameter portions on the same axis connected to a single retarder, the guiding track being designed such that when the trolley is loaded the smaller diameter wheel engages the track and when the trolley is empty the track is engaged by the larger diameter wheel. This arrangement has proven to be very successful in many applications.

In some installations it is necessary to change the retarding force on the trolley because the same trolley-track conveyor is being used to convey a workpiece of different weight. Thus, where the weight of a workpiece varies substantially from a previously conveyed workpiece, a different dual diameter wheel must be obtained and substituted for the wheel previously used. Dual diameter wheels, as distinguished from single diameter wheels in a wide range of sizes, are not standard stock items. In addition, where a trolley is provided with a wheel having dual diameters on the same axis, depending on the track configuration, the load is suspended at different distances below the track when the trolley is supported on the different diameter portions of the wheel. At times this is a disadvantage.

The object of the present invention is to provide a retarding arrangement for trolleys that is economical and also permits a wide latitude in design relative to the loading of a trolley.

More specifically, in the conveyor arrangement of the present invention each trolley is provided with at least two separate track engaging wheels, each wheel being connected to its own retarder. Thus, the desired velocity of the trolley in the loaded condition and in the unloaded condition is obtainable by selecting a wheel of different diameter or by utilizing a retarder designed to apply a different retarding torque to the wheel with which it is associated.

Other objects, features and advantages of the present invention will become apparent from the following description and accompanying drawing, in which:

FIG. 1 is a fragmentary side elevational view of a trolley conveyor of the present invention;

FIG. 2 is a sectional view along the line 2—2 in FIG. 1;

FIG. 3 is a top view of a modified form of retarder;

FIG. 4 is a top view, partly in section, of another modified form of retarder; and FIG. 5 is a velocity force vector diagram illustrating basic principles involved in the present invention.

In FIGS. 1 and 2 there is illustrated a trolley assembly 10 adapted to be supported on a track 12 by two sets of wheels. Each set of wheels comprises a small diameter wheel 14 fixed on an axle 16 and a large diameter wheel 18 fixed on an axle 20. Track 12 is inclined downwardly and is suspended from a suitable overhead structure by hangers 22. Each trolley assembly 10 includes a pair of depending arms 24 which support a pallet 26 for a workpiece W at their lower ends. The upper end of each arm 24 is connected to a retarder assembly 28. Each retarder assembly 28 includes a pair of cylindrical retarder housings 30a, 30b which are closed at one end by a cover 32. Each housing 30 includes a tubular section 33 at one end and an enlarged circular cavity section 34 at its other end. Axle 20 for wheel 18 extends axially through the tubular portion 33 of housing 30a and is supported therein by bearings 36. Axle 20 extends into the annular cavity section 34 in housing 30a and is sealed therein by an annular seal 38. Cavity section 34 is filled with a viscous fluid (such as silicone oil) which possesses substantially Newtonian characteristics. Within cavity 34 there is fixedly mounted on the end of axle 20 a disc 40. It is well known that with such a Newtonian fluid the shear force required to shear the fluid is directly proportional to the time rate of shear exerted on the fluid. Therefore, the retarding torque exerted on axle 20 by the rotating disc 40 is directly proportional to the annular velocity of axle 20. The factor of proportionality is dependent upon the viscosity of the fluid, the diameter of disc 40 and the thickness of the fluid space on the opposite sides of disc 40.

Axle 16 of wheel 14 is supported within retarder housing 30b in the same manner as described above and has fixed thereon a similar disc 40. The two housings and the discs are of similar size. However, in each retarder assembly 28 the two housings are spaced apart longitudinally of the trolley assembly 10 and are also preferably spaced apart vertically so that the lower peripheral portions of all four wheels lie in substantially the same plane.

In the arrangement illustrated in FIGS. 1 and 2, when the pallet 26 is carrying a workpiece the trolley will be supported on track 12 by the smaller diameter wheels 14. When the pallet 26 is empty the trolley will be supported on track 12 or on a similar track 12' spaced laterally from and forming an extension of track 12. The use of different diameter wheels permits independent control of the velocity of the trolley when loaded and when empty, including, but not restricted to, having the loaded and empty trolleys travel along the downwardly sloping tracks at substantially the same speed.

The effect of the rolling diameter on the speed of descent may be understood by reference to FIG. 5, a schematic velocity and force vector diagram of a wheel supporting a weight $W_1$ having a diameter $D_1$, and rolling down a track inclined to the horizontal at a constant angle $\alpha$, and moving with an angular velocity $\omega$ and linear velocity V. It can be seen that the force, parallel to the track, causing the wheel to move forward is:

$$F_1 = W_1 \sin \alpha$$

This in turn creates a forward torque $T_F$ on the wheel $$T_F = F_1 \frac{D_1}{2} = \frac{D_1}{2} W_1 \sin \alpha$$

As the wheel rolls down the track and substantial equilibrium is reached, i.e., the wheel is neither accelerating nor decelerating, the forward torque $T_F$ and the retarding torque $T_R$ are equal (and opposite). The retarding torque may be expressed as:

$$T_R = K_1 \omega$$

Since $$\omega = \frac{V}{\frac{D_1}{2}}$$

where V is the equilibrium velocity, $$T_R = \frac{2K_1 V}{D_1}$$

Since $T_F = T_R$ $$\frac{D_1}{2} W_1 \sin \alpha = \frac{2K_1 V}{D_1}$$

Solving for V $$V = \frac{\sin \alpha}{4K_1} W_1 D_1^2$$

This equation indicates that the equilibrium forward rolling velocity is proportional to the weight and the square of the rolling diameter. In the specific case where it is desired to have the rolling velocity of an empty pallet equal the rolling velocity of a full pallet, it can be seen that:

$$W_E D_E^2 = W_F D_F^2$$

where $W_E$ and $W_F$ are the empty and full weights respectively and $D_E$ and $D_F$ are the rolling diameters for the empty and full conditions respectively. This condition can be expressed also as:

$$D_E = D_F \frac{W_F}{W_E}$$

In FIGS. 1 and 2 the difference in the weights of the two conditions of the trolley is compensated for by the difference in diameter of wheels 14,18. It will be appreciated that substantially the same velocity control can be obtained by changing other variable parameters of the trolley assembly. For example, in FIG. 3 the two track engaging wheels 44,46 of retarders 48,50, respectively, are of substantially the same diameter. In this arrangement the different retarding forces applied to the trolley when loaded and when empty is obtained by the difference in the viscosity of the viscous fluid in the respective retarders. Thus, retarder 48 associated with wheel 44 contains a low viscosity fluid and is arranged to support the trolley on the track when the trolley is empty. When the trolley is loaded wheel 46 will engage the track and its velocity will be controlled by retarder 50 which contains a high viscosity fluid. It will be apparent that the viscosity of the fluids in these two retarders can be varied infinitely as desired by mixing the proper proportions of two viscous fluids that have two widely different viscosities.

In the arrangement shown in FIG. 4 the two wheels 52,54 associated with retarders 56,58, respectively, also have the same diameter. In this arrangement the difference in the retarding forces applied to the trolley when loaded and when empty is obtained by employing discs 60,62, respectively, of different diameters and spaced from the cavity side walls equal distances. When the trolley is empty wheel 52 will engage the track and the velocity of the trolley will be controlled by the smaller disc 60. When the trolley is loaded with a workpiece wheel 54 will engage the track and the speed of the trolley will be controlled by the larger disc 62. In this arrangement the viscosity of the fluid in the two retarders may be the same and the difference in the retarding force applied to the trolley will be dependent entirely upon the relative sizes of the two discs.

While the retarders illustrated in FIGS. 1 through 4 all employ a viscous fluid operating in shear between a rotor and a housing to create a retarding torque substantially proportional to the angular velocity of the rotor, the well known principle of magnet and eddy current retardation can also be utilized. For example, in the type of retarder illustrated in FIG. 2 a permanent magnet or a group of permanent magnets could be mounted on cover 32 or on the cavity section 34 of the retarder housing, or both, to create a magnetic field perpendicular to the plane of disc 40. The disc 40 would be made of a suitable electrical conductor (such as aluminum). With such an arrangement rotation of disc 40 would induce electrical currents therein proportional to the angular velocity of the disc and the eddy currents thus generated would in turn create a proportional retarding torque on the wheels. It will also be apparent that the rotor of the retarder could be in the form of a cylindrical sleeve rather than a disc. However, because of the lower torques attainable with eddy current retardation as compared with viscous shear retardation, a step-up gear ratio from the wheel axle to the retarder shaft would be advisable.

We claim:

1. A gravity conveyor comprising downwardly inclined track means, a trolley adapted to support a workpiece and supported on said track means for travel thereon in response to the gravitational force on the trolley, said trolley being supported on said track means by a pair of separate track-engaging wheels, said trolley and track means being designed so that one of said wheels engages the track means when the trolley is empty and the other wheel engages the track means when the trolley is loaded with a workpiece, a first means for applying a retarding torque to said one wheel and separate second means for applying a retarding torque to the second wheel, whereby each of said wheels is prevented from rolling freely on the track means to thereby control the velocity of the trolley when empty and when loaded, the diameters of the two wheels and the two means for applying torque thereto being selected such that one wheel and the torque applying means for said wheel produces a greater retarding torque than the other wheel and the means for applying torque thereto, even when the trolley is subjected to the same loading, the wheel and torque applying means which produces the greater torque being utilized when the trolley is loaded and the wheel and torque applying means which produces the lesser torque being utilized when the trolley is empty.

2. A gravity conveyor as called for in claim 1 wherein said means for applying retarding torques to said wheels comprise viscous shear retarders each having a rotor rotatable within a cavity filled with a viscous fluid.

3. A gravity conveyor as called for in claim 2 wherein the wheel adapted to engage the track means when the trolley is empty is of larger diameter than the other wheel.

4. A gravity conveyor as called for in claim 3 wherein the rotors of the two retarders are of substantially the same size.

5. A gravity conveyor as called for in claim 2 wherein the axes of the two wheels are spaced apart vertically so that the trolley is spaced vertically from the track means the same distance when either of the wheels engages the track means.

6. A gravity conveyor as called for in claim 2 wherein the fluid in the retarder associated with the wheel engaging the track means when the trolley is empty has a lower viscosity than the fluid in the other retarder.

7. A gravity conveyor as called for in claim 6 wherein the two wheels are of substantially the same size.

8. A gravity conveyor as called for in claim 2 wherein the rotor of the retarder associated with the wheel engaging the track means when the trolley is empty is smaller than the rotor of the other retarder.

9. A gravity conveyor as called for in claim 8 wherein the two wheels are of substantially the same diameter.

10. A gravity conveyor as called for in claim 8 wherein said rotors are discs and the disc of the retarder associated with the wheel engaging the track means when the trolley is empty is of smaller diameter than the disc of the other retarder.

11. A gravity conveyor as called for in claim 1 wherein said track means comprises a single track engageable by either of the two wheels.

12. A gravity conveyor as called for in claim 1 wherein said track means comprises a pair of successive parallel tracks, one of said wheels being adapted to engage one of said tracks and the other wheel being adapted to engage the other track.

* * * * *